(12) United States Patent
Hochmuth et al.

(10) Patent No.: US 6,337,689 B1
(45) Date of Patent: Jan. 8, 2002

(54) ADAPTIVE BUFFERING OF COMPUTER GRAPHICS VERTEX COMMANDS

(75) Inventors: Roland M Hochmuth, Ft Collins; Samuel C Sands, Loveland; Bradley Louis Saunders; Alan D Ward, both of Ft Collins, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/302,659

(22) Filed: Apr. 3, 1999

(51) Int. Cl.[7] .......................... G06T 15/00; G06F 15/16
(52) U.S. Cl. .................. 345/522; 345/503; 345/536; 345/558; 345/419
(58) Field of Search .................... 345/419, 581, 345/501, 503, 522, 536, 553, 558, 559

(56) References Cited

U.S. PATENT DOCUMENTS

| | | | | |
|---|---|---|---|---|
| 5,920,326 A | * | 7/1999 | Rentschler et al. | 345/503 |
| 6,018,353 A | * | 1/2000 | Deering et al. | 345/511 |
| 6,088,044 A | * | 7/2000 | Kwok et al. | 345/505 |
| 6,184,908 B1 | * | 2/2001 | Chan et al. | 345/522 |
| 6,188,410 B1 | * | 2/2001 | Brethour et al. | 345/501 |
| 6,256,041 B1 | * | 7/2001 | Deering | 345/426 |

OTHER PUBLICATIONS

Kilgard, Mark, J., "Realizing OpenGL: Two Implementations of One Architecture", Proceedings of the 1997 SIGGRAPH/Eurographics Workshop on Graphics Hardware, 1997, pp. 44–55.*

McCormack, J., McNamara, R., Gianos, C., Seiler, L., Jouppi, N., Correll, K., "Neon: A Single–Chip 3D Workstation Graphics Accelerator", Proceedings of the 1998 Eurographics/SIGGRAPH Workshop on Graphics Ha.*

* cited by examiner

Primary Examiner—Ulka J. Chauhan
(74) Attorney, Agent, or Firm—Kevin M. Hart

(57) ABSTRACT

A method of buffering graphics vertex commands adaptively. A minimally-formatted vertex values buffer is created. As vertex commands are received from application software, attribute values are stored in an attribute values buffer until a vertex coordinate command is received. Upon receipt of a vertex coordinate command, attribute values are copied from the attribute values buffer into the vertex values buffer. Whenever application software issues a vertex attribute command corresponding to an attribute type that is not currently reflected in the vertex values buffer format, the vertex values buffer is automatically reformatted to include the new attribute type. Thus, the vertex values buffer automatically adapts itself to the behavior of the application. Multiple primitives are buffered between flushes. First-call and subsequent-call versions of code are provided for vertex commands. At initialization, a dispatch table is populated with pointers to the first-call versions. Thereafter, the dispatch table entries are manipulated by the commands themselves. Multiple subsequent-calls versions are provided for a single vertex coordinate command, each of the different subsequent-calls versions optimized for a different vertex values buffer format. The first-call version of the command determines which of the subsequent-calls versions is optimal for the current vertex values buffer format, and places a pointer to the optimized version in the dispatch table. Thereafter, the copying of values from the attribute values buffer into the vertex values buffer is done by the subsequent-calls version in a manner that corresponds exactly to the current vertex values buffer format, and without making any decisions.

39 Claims, 9 Drawing Sheets

ADAPTIVE BUFFERING OF COMPUTER GRAPHICS VERTEX COMMANDS

FIELD OF THE INVENTION

This invention relates to the field of computer graphics, and more particularly to a technique for speeding rendering performance by adaptively buffering vertex commands issued by application software.

BACKGROUND

Computer Graphics Systems and APIs

Modern graphics-intensive application software is usually written to assume the presence of a state machine in the host computer or network for generating graphical objects on a display. Such application software drives the display by first issuing state-setting commands for configuring the graphics state machine, and then issuing vertex commands that cause the state machine to render geometric primitives in accordance with the machine's current state. A graphics API, or "application programmer's interface," is a set of defined commands that the application programmer may use to accomplish these activities in a device-independent manner. In short, a graphics API is a software interface to graphics hardware. One well-known graphics API is called "OpenGL." OpenGL consists of about 150 defined commands that application programs may use to specify the objects and operations necessary to produce graphical images in a display window.

FIG. 1 illustrates a computer system 100 that utilizes OpenGL in a typical manner. Computer system 100 includes at least one CPU 102, system memory 104, memory and I/O controller 106, and I/O devices 108 such as a printer, scanner, network interface or the like. A keyboard and mouse would also usually be present as I/O devices, of course, but may have their own types of interfaces to computer system 100. Stored within system memory 104 are application software 130 and OpenGL software 132. OpenGL software 132 includes OpenGL dispatch table 134, device-independent OpenGL library 136 and device-dependent module 138. Typically, memory and I/O controller 106 will include a system bus 110 and at least one bus interface such as AGP bus bridge 112 and PCI bus bridge 114. PCI bus bridge 114 may be used to interface I/O devices 108 to system bus 110, while AGP bus bridge 112 may be used, for example, to interface graphics subsystem 116 to system bus 110. The specific types of buses shown in the drawing, as well as the overall architecture of computer system 100, are provided by way of example only. Other bus types and architectures may be used in alternative OpenGL implementations. For example, it is well known to utilize OpenGL in an X Window System client-server environment in which the application program runs on one computer while its display appears on a remote computer.

Graphics subsystem 116 will typically include graphics rendering hardware 118, frame buffer controller 120 and frame buffer memory 122. Frame buffer controller 120 is interfaced with a video controller 124 (e.g., digital-to-analog converters and sync/blank generation circuitry) for driving display monitor 126. Graphics rendering hardware 118 will typically include 2D acceleration and rasterization hardware interfaced with AGP bus 113 and frame buffer controller 120. In higher-end embodiments, rendering hardware 118 may include 3D geometry acceleration hardware, as well as texture mapping hardware interfaced with a texture memory 128.

In operation, application software 130 first utilizes operating system calls or windowing system calls to establish a window on the display. Thereafter, application software 130 may use OpenGL function calls to clear the established window and to draw geometric primitives such as points, lines and polygons into the window. The mechanics of those function calls will be better understood with reference to FIG. 2: Device-independent OpenGL library 136 is typically implemented as a dynamically linkable library of code segments 200–204 wherein each code segment is for executing a corresponding OpenGL command. One entry exists in dispatch table 134 for each implemented OpenGL command; and each entry in the table is a pointer to the proper code segment 200–204 for executing the command. Thus, when application software 130 makes an OpenGL function call 206, the name of the function called is used as an index into dispatch table 134. The code segment 200–204 pointed to by the indexed entry is executed. Then control returns to application software 130 as shown at 208.

Graphics Command Types

Application software 130 specifies geometric primitives to be drawn by their vertices. For example, to draw a triangle, application software 130 could make the following OpenGL function calls:

glBegin(GL_TRIANGLES);
        glColor3f(1.0, 0.0, 0.0); /*red*/
        glVertex2i(25, 25);
        glColor3f(0.0, 1.0, 0.0); /*green*/
        glVertex2i(100, 325);
        glColor3f(0.0, 0.0, 1.0); /*blue*/
        glVertex2i(175, 25);
    glEnd( );

This series of functions calls would cause a triangle to be drawn having a red vertex at x,y coordinates (25, 25), a green vertex at coordinates (100, 325) and a blue vertex at coordinates (175, 25).

Each function call in the above example corresponds to a command. The glBegin and glEnd commands are delimiters used to indicate the beginning and the end of a geometric primitive. The glBegin command also specifies which primitive type (in this case, GL_TRIANGLES) the graphics pipeline should assume when rendering the vertices that follow the command. The glBegin and glEnd commands are instances of a class of OpenGL commands called "state" commands, so named because they cause the graphics pipeline or state machine to assume a certain state. Other examples of state commands would be commands that specify the locations or characteristics of light sources, commands that indicate clipping parameters, and so on. Changes to any of these latter kinds of states are called "modal" state changes, because they alter the mode of the graphics state machine.

The other class of OpenGL commands of interest herein is called "vertex commands." There are two basic types of vertex commands: vertex attribute commands, and vertex coordinate commands. In the above example, the glColor commands are vertex attribute commands, because they specify the color attribute for a vertex. Other examples of vertex attribute commands would be glNormal, glTexCoord, glEdgeFlag and glMaterial. The glVertex commands in the above example are vertex coordinate commands, because they specify coordinates for a vertex. By way of further background, the glVertex 2 command specifies a vertex coordinate in two dimensions; but other vertex commands are available for specifying vertex coordinates in more than two dimensions—glVertex3, and glVertex4.

In the above example, two function calls were required for each vertex (in addition to the glBegin and glEnd function calls on either end of the sequence). For cases in which application software wishes to specify other attributes for each vertex, such as texture coordinates, normal direction, material type and edge flags, the application software must use an additional function call per vertex for each attribute. The number of function calls required to draw the primitive increases commensurately.

Array Functions

In order to reduce the number of OpenGL function calls required to specify the vertices of a given primitive, array functions were introduced with OpenGL version 1.1. When using array functions, application software 130 creates a separate array for each vertex attribute to be specified, and then draws the primitive by indexing into the arrays. For example, application software 130 can use the glArrayElement( ) function to draw a triangle by referencing individual array elements to specify the vertices:

```
static GLint vertices[ ] = {    25,    25,
                               100,   325,
                               175,    25    };
static GLfloat colors[ ] = {    1.0,   0.0,   0.0,
                                0.0,   1.0,   0.0,
                                0.0,   0.0,   1.0   };
``` glEnableClientState(GL_VERTEX_ARRAY);
  glEnableClientState(GL_COLOR_ARRAY);
  glColorPointer(3, GL_FLOAT, 0, colors);
  glVertexPointer(2, GL_INT, 0, vertices);
    glArrayElement(0);
    glArrayElement(1);
    glArrayElement(2);
  glEnd( );

Although a certain amount of overhead is expended to initialize the arrays and to enable their use, after this has been done only one function call per vertex is required between the glBegin( ) and glEn( ) pair to draw the same triangle as was drawn in the previous example. The glEnableClientState commands enable the use of arrays for vertex coordinates and for specific vertex attributes. The glColorPointer and glVertexPointer commands provide pointers to the enabled arrays. The glEnableClientState commands and the gl-Pointer commands are examples of commands that manipulate "draw arrays state."

Application software 130 can use another OpenGL array function called glDrawElements( ) to draw the entire triangle with a single function call. Whereas the glArrayElement( ) function specified array indices individually, the glDrawElements( ) function requires that the indices themselves be saved into an array. Application software 130 then draws the triangle by referencing the array of indices:

static GLubyte indices[ ]={0, 1, 2};
        glDrawElements(GL_TRIANGLES, 3, GL_UNSIGNED_BYTE, indices);

Yet another array function, glDrawArrays( ), may be used by application software 130 to accomplish the same result without first specifying a separate array of indices:

glDrawArrays(GL_TRIANGLES, 0, 3);

The second argument in the glDrawArrays( ) function call specifies the starting index in the enables arrays. The third argument specifies the number of indices to be rendered.

Finally, application software 130 may specify more than one primitive of a given type with a single function call by using Hewlett-Packard Company's glDrawArraySetHP( ) function, which is defined as follows:

| void | glDrawArraySetHP( | |
| | GLenum | mode |
| | const GLint* | list |
| | GLsizei | count). |

Mode specifies what kind of primitives to render. List points to an array of starting indices in the enabled arrays. Count specifies the number of primitives (groups of vertices) to be rendered. An example of the usage of glDrawArraySetHP( ) is as follows:

```
static GLint vertices[ ] = {    25,    25,       /* vertices array entry 0 */
                               100,   325,       /* vertices array entry 1 */
                               175,    25,       /* vertices array entry 2 */
                                35,    35,       /* vertices array entry 3 */
                               110,   335,       /* vertices array entry 4 */
                               185,    35    }; /* vertices array entry 5 */
static GLfloat colors[ ] = {    1.0,   0.0,   0.0,   /* colors array entry 0 */
                                0.0,   1.0,   0.0,   /* colors array entry 1 */
                                0.0,   0.0,   1.0,   /* colors array entry 2 */
                                0.0,   0.0,   1.0,   /* colors array entry 3 */
                                0.0,   1.0,   0.0,   /* colors array entry 4 */
                                1.0,   0.0,   0.0  }; /* colors array entry 5 */
``` static GLubyte indexes_array[ ]={0, 3, 6 };
  glEnableClientState(GL_VERTEX_ARRAY);
  glEnableClientState(GL_COLOR_ARRAY);
  glColorPointer(3, GL_FLOAT, 0, colors);
  glVertexPointer(2, GL_INT, 0, vertices);
  glDrawArraySetHP(GL_TRLANGLES, indexes_array, 2);

In this example, vertex information corresponding to triangle one is specified by entries 0–2 in the vertices and colors arrays. Vertex information for triangle two is specified by entries 3–5 in the vertices and colors arrays. The entries in indexes_array are used by the glDrawAiraySetUP function to determine which entries of the vertices and colors arrays correspond to the first vertex for each triangle. Specifically, glDrawArraySetHP is functionally equivalent to:

for(i=0; i<count; i++)
  {
      glDrawArrays(mode, list[i], list[i+1]–list[i]);
  }

For a given computer graphics pipeline, the use of array functions to specify primitives always yields faster rendering performance. Unfortunately, not all application software is capable of issuing array function calls to specify primitives. Legacy application software is still in use today that was produced for OpenGL version 1.0, which version did not include array functions. And other application software exists for which it would not make sense to use array functions even in an OpenGL version 1.1 environment. For example, some application programs are optimized for manipulating data models that are not based on vertex arrays; thus, to require these applications to issue array function calls would require that processor time be allocated to the creation of vertex arrays in addition to the activity of manipulating the data model. This would likely decrease performance for the application even if it would enhance downstream graphics rendering performance.

Vertex Command Buffering

For these reasons, one OpenGL library has buffered vertex commands issued by application software in order to construct a vertex array downstream of the application software. This prior art method is illustrated in FIGS. 3 and 4. At initialization step 300, several arrays are created in memory: vertex coordinates array 400, vertex attributes array 402, and flags array 404. Also in step 300, a current_vertex count variable is set to zero. In step 302, a computer graphics command is received from application software 130. If the command is not a glBegin command (step 304), then it is processed (step 306) and another command is received at step 302. If the command is a glBegin command, then the primitive type is set accordingly and another command is received at step 308. This command should be either a vertex attribute command, a vertex coordinate command, or a glend command (step 310).

If the command is a vertex attribute command, then in step 312 the attribute value specified by the command is stored directly into the corresponding row of vertex attribute array 402 at current_vertex. Then, in step 314, a flag is set in the corresponding row of flags array 404 at current_vertex. For example, if the attribute command were glColor and the current_vertex count were zero, then the color value would be written into attributes[0].color, and a flag would be set in flags[0].color. No flags would be set in flags.normal or any of the other rows of the flags array. Then operation would resume at step 308.

If the command received at step 308 is a vertex coordinate command, then in step 316 the coordinate value specified by the command is stored directly into vertex coordinates array 400 at current_vertex. At step 318, the current_vertex count variable is incremented. In step 320, the current_vertex count variable is compared with a maximum to determine whether the arrays are full. If not, operation resumes at step 308. If so, or if the command received at step 308 was a glEnd command, then operation continues at step 322.

At step 322, a logical OR is determined for each of the rows in flags array 404. Thus, a logical OR is determined for the values in flags.color, a separate logical OR is determined for the values in flags.normal, and so on. These logical ORs will indicate whether or not the corresponding row of attributes array 402 must be used to render the buffered primitive. If the OR result for a given row is "1," then the corresponding row of the attributes array must be used to render the buffered primitive. If the OR result for a given row is "0," then the corresponding row of the attributes array need not be used to render the buffered primitive. For each of the needed rows, draw arrays state should be modified at this time to enable the arrays and to provide pointers to them.

In order for an array function to render the buffered primitive properly, each of the enabled arrays must be "regular" in the sense that each enabled array must contain valid values in every entry. (The application software may have explicitly specified color for the first vertex of a five-vertex polygon, for example, but not for any of the remaining vertices of the polygon. If so, then the value in attributes[0].color must be duplicated into attributes[2-4].color before an array function is called to render the polygon.) Thus, in step 324, a logical AND is determined for the values in each row of flags array 404. If the AND result for a given row is "1," then the corresponding row of the attributes array need not be regularized. But if the AND result for a given row is "0," then the corresponding row of the attributes array must be regularized. To accomplish the regularization, the following algorithm may be used:

```
temp attribute value=OpenGL state value for this
    attribute;
for(i=0 to current_vertex)
{
    if(flags[i].this attribute==0)
        attributes[i].this attribute=temp attribute value;
    else
        temp attribute value=attributes[i].this attribute;
}
```

Finally, in step 326, the contents of vertex coordinates array 400 and the enabled rows of vertex attributes array 402 are rendered by means of an array function call. Flags array 404 is cleared, the current_vertex count is set back to zero, and operation resumes at step 302.

While the prior art buffering method of FIGS. 3 and 4 does improve graphics rendering performance for application software that does not issue array function calls to specify primitives, it has certain drawbacks. First, it buffers only one primitive at a time. Therefore, while it saves some processing states by using an array function call to render a primitive instead of using individual vertex commands, it incurs overhead states each time a primitive is rendered. Second, the technique of using flags array 404 to keep track of changes in vertex attribute values by application software results in code that contains many decisions and indirect memory references. This increases the number of processor states required to execute the code which, in turn, slows performance.

It is therefore an object of the invention to buffer computer graphics commands in a manner that conserves processor states, thereby improving rendering performance to a greater degree than prior art buffering methods improved rendering performance.

SUMMARY OF THE INVENTION

The invention includes numerous aspects, each of which contributes to achieving the above and other objectives.

In one aspect, the invention includes a method of buffering graphics vertex commands adaptively. At initialization, a minimally-formatted vertex values buffer is created for buffering values corresponding to multiple vertices, and an attribute values buffer is created for buffering attribute values corresponding to a single vertex. As vertex commands are received from application software, attribute values are stored in the attribute values buffer until a vertex coordinate command is received. Upon receipt of a vertex coordinate command, attribute values are copied from the attribute values buffer into the vertex values buffer; but the only attribute values copied are those that correspond to the current format of the vertex values buffer. Because the vertex values buffer is minimally formatted, the inventive buffering method conserves processing states during copying. Whenever the application software issues a vertex attribute command corresponding to an attribute type that is not currently reflected in the vertex values buffer format, the vertex values buffer is automatically reformatted to include space for values corresponding to the new attribute type. Thus, the vertex values buffer automatically adapts itself to the behavior of the application; but the vertex values buffer neither stores nor allocates space for values that have not previously been specified by the application software. Not only are processing states conserved, but bandwidth is conserved as well for implementations that must transmit vertex data over a network connection. Moreover, the inventive buffering method yields a buffer that is already regularized at flush time, thus further conserving processor states.

In a further aspect, multiple primitives are buffered between flushes, thereby further conserving processor states by amortizing array function overhead across multiple primitives.

In yet a further aspect, a preferred implementation greatly reduces the number of decision states required to buffer graphics commands. First-call and subsequent-call versions of code are provided for vertex attribute commands and for vertex coordinate commands. At initialization time, a dispatch table is populated with pointers to the first-call versions for each command. Thereafter, the dispatch table entries are manipulated by the commands themselves.

When invoked, the first-call versions of the vertex attribute commands determine whether the current attribute format of the vertex values buffer is compatible with the attribute type specified by the command. If the format is, incompatible, the first-call command version reformats the vertex values buffer appropriately. The first call version then replaces its own dispatch table entry with a pointer to its own subsequent-calls version and calls the subsequent-calls version to write the new attribute value into the attribute values buffer.

The first-call versions of the vertex coordinate commands determine whether the current coordinate format of the vertex values buffer is compatible with the coordinate dimensions specified by the command. If the format is incompatible, the first-call command version reformats the vertex values buffer appropriately. The first call version then replaces its own dispatch table entry with a pointer to a subsequent-calls version and then calls the subsequent-calls version to copy attribute values from the attribute values buffer into the vertex values buffer, and to write the new coordinate value into the vertex values buffer.

In yet a further aspect, multiple subsequent-calls versions are provided for a single vertex coordinate command. Each of the different subsequent-calls versions is optimized for a different vertex values buffer format. The first-call version of the command determines which of the subsequent-calls versions is optimal for the current vertex values buffer format, and places a pointer to the optimized version in the dispatch table. Thereafter, the copying of values from the attribute values buffer into the vertex values buffer is done by the subsequent-calls version in a manner that corresponds exactly to the current vertex values buffer format, and without making any decisions related to determining the state of the vertex values buffer format. Thus, even more processing states are conserved because the number of decisions made during buffering is reduced: Once a selection has been made as to which subsequent-calls code version is optimal for the current buffer format, no further decisions relating to the buffer format need be made until the buffer format changes.

DETAILED DESCRIPTION OF THE PREFERRED EMBODIMENTS

Overview

Figure 1:
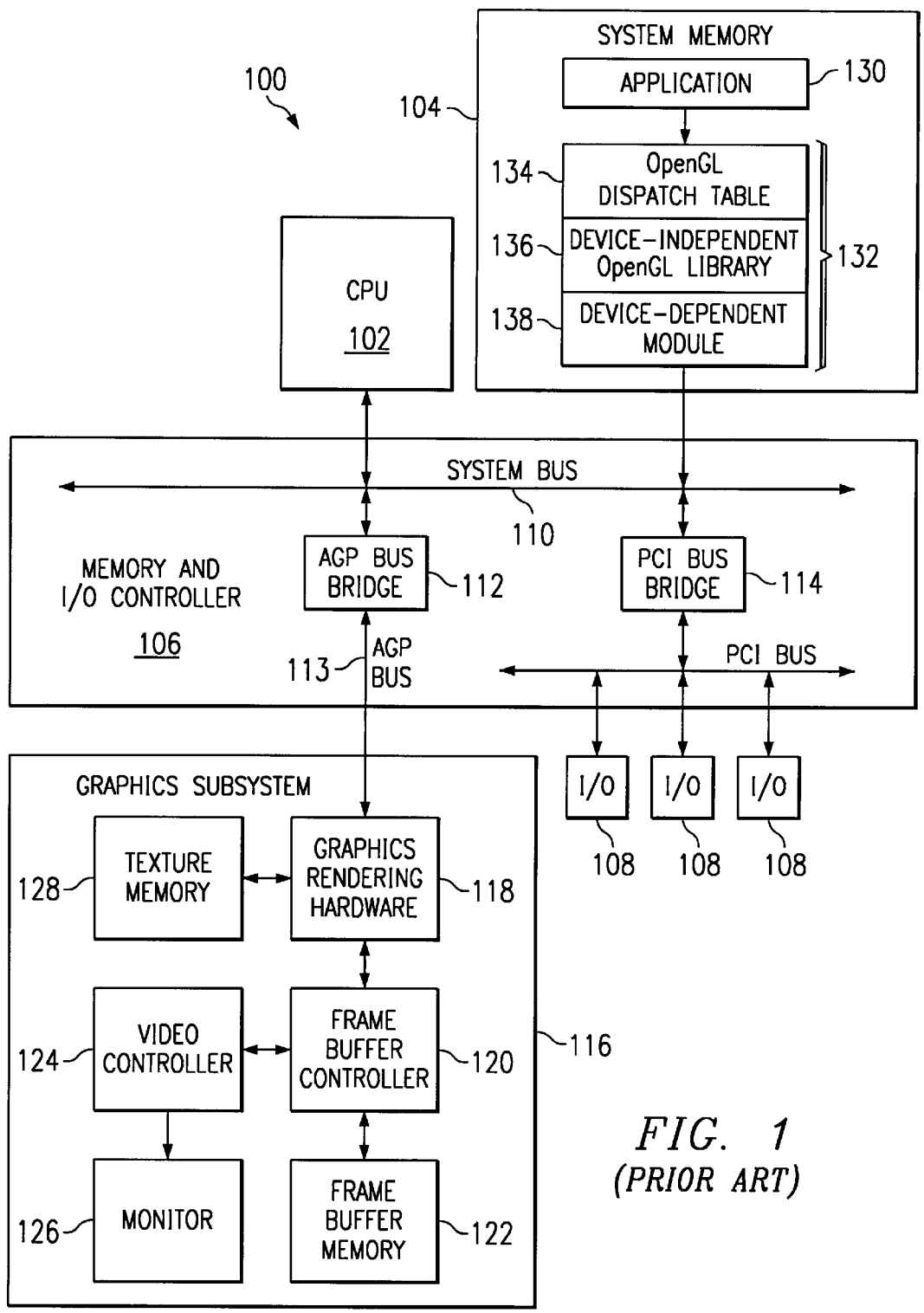
FIG. 1 is a block diagram illustrating a computer system utilizing an OpenGL library in a conventional manner.
Figure 2:
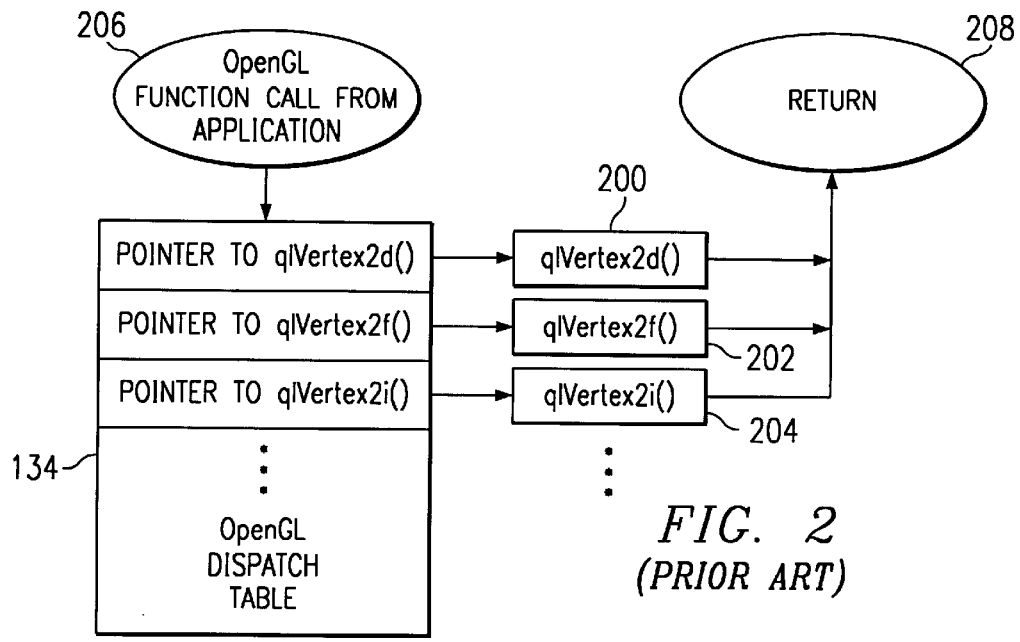
FIG. 2 is a block diagram illustrating the mechanics of a conventional OpenGL function call.
Figure 4:
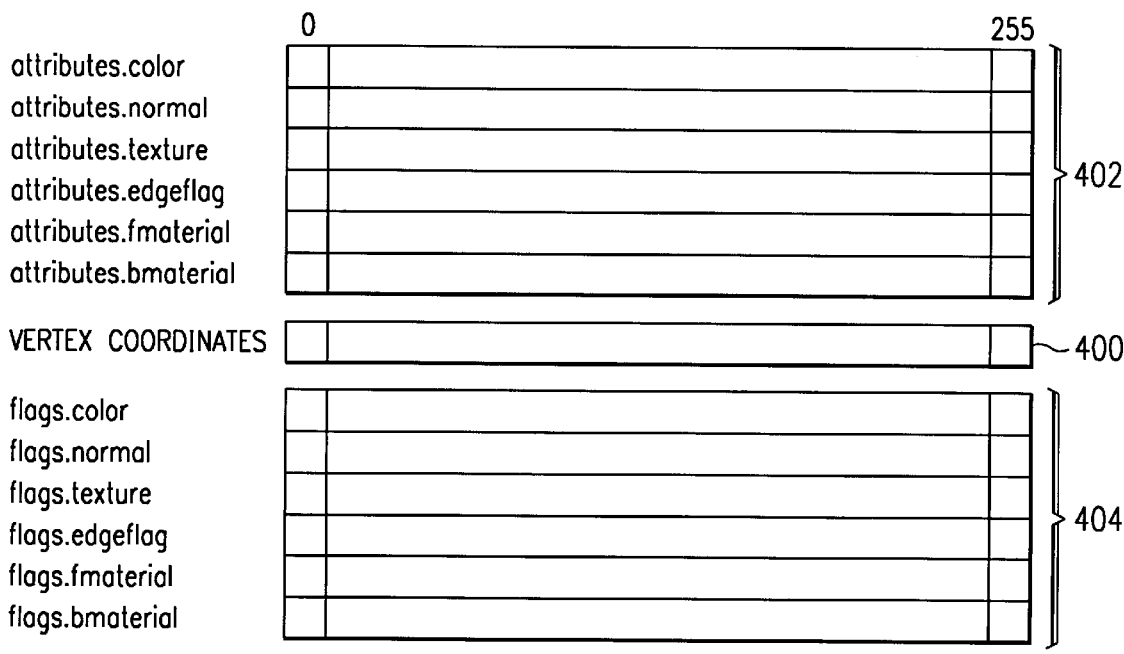
FIG. 4 is a block diagram illustrating arrays used by the prior art buffering method of FIG. 3.
Figure 3:
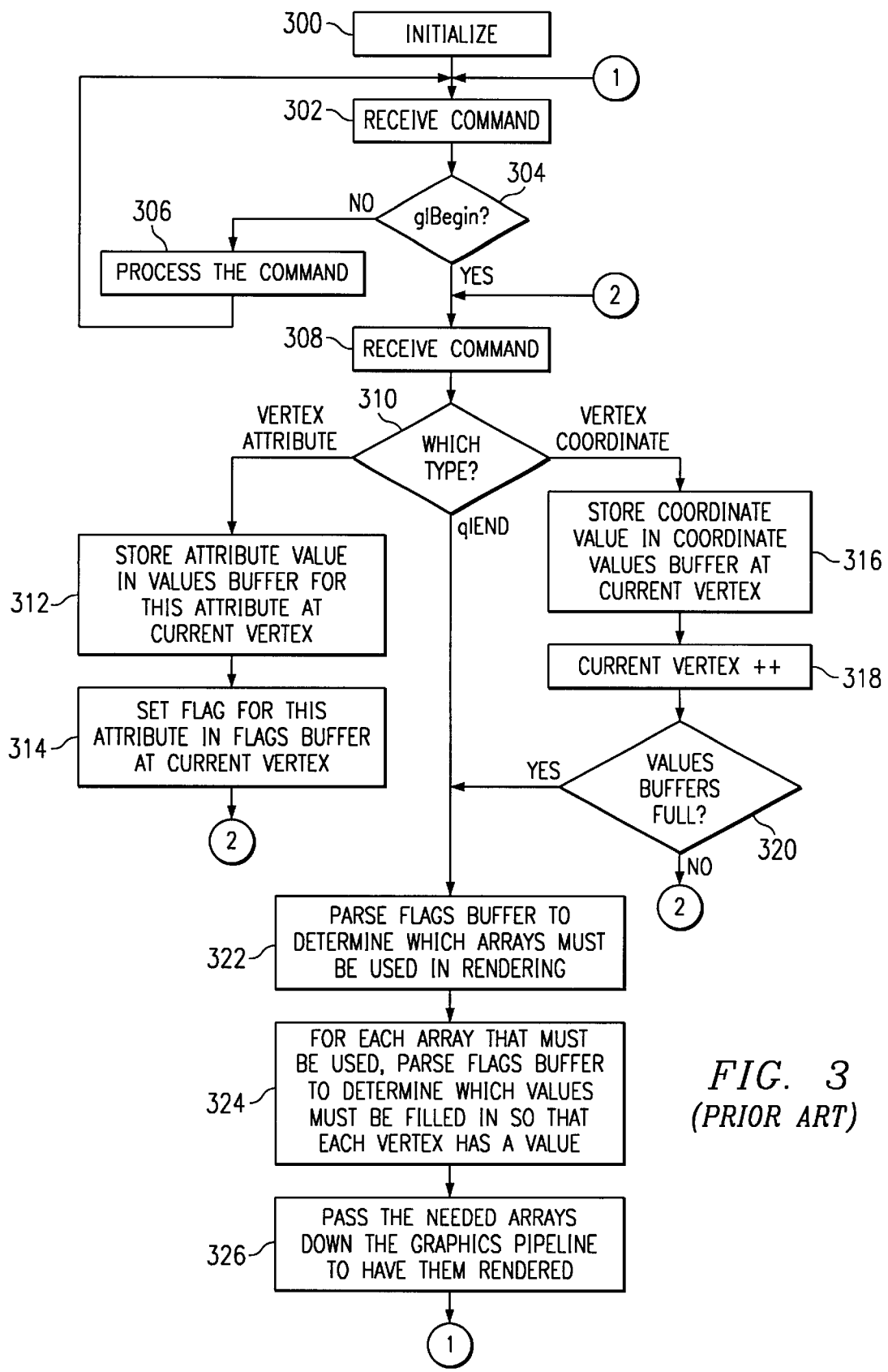
FIG. 3 is a flow diagram illustrating a prior art computer graphics command buffering method.
Figures 5A, 5C:
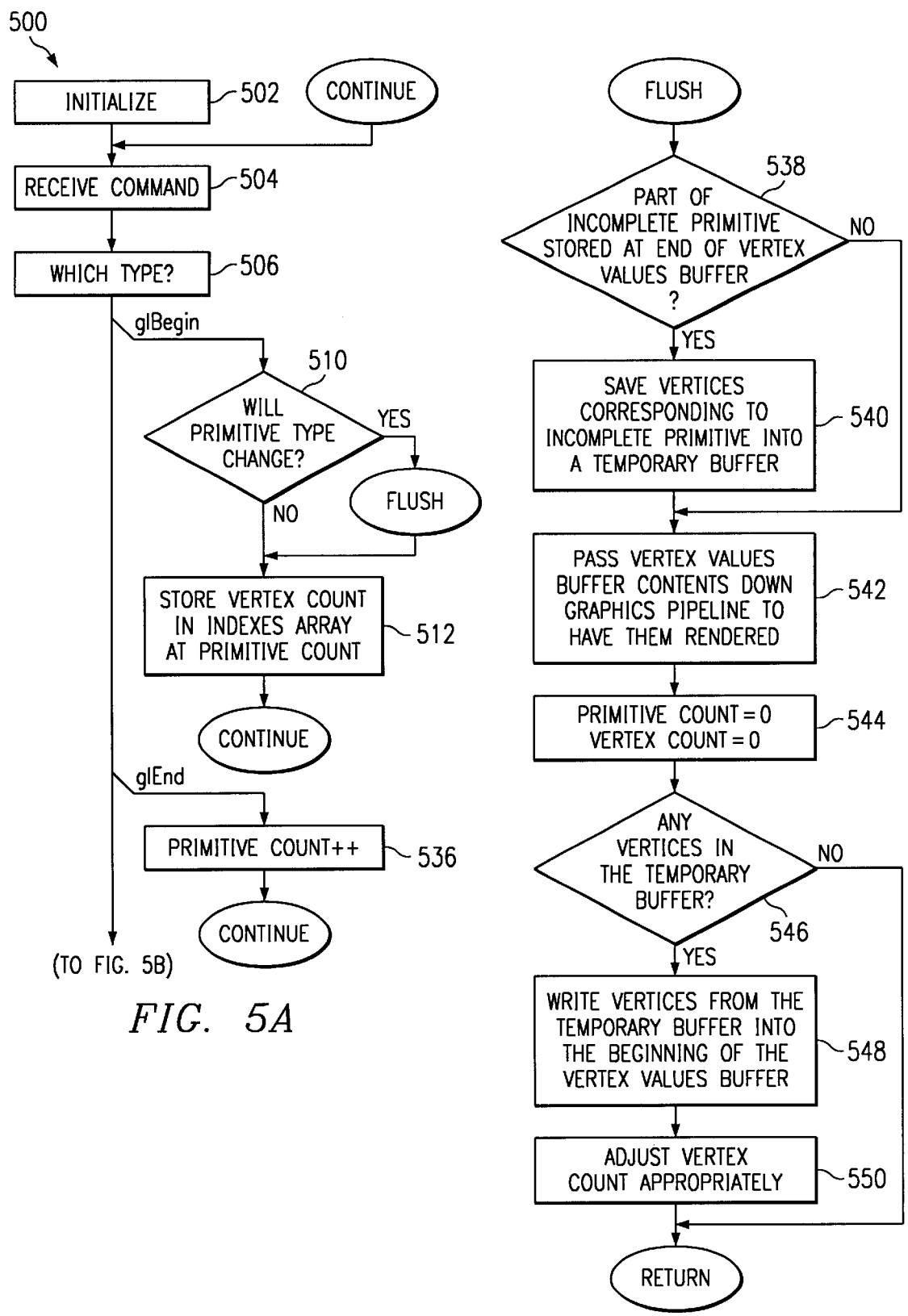
FIGS. 5A–C is a flow diagram illustrating a computer graphics command buffering method according to a preferred embodiment of the invention.
Figure 5B:
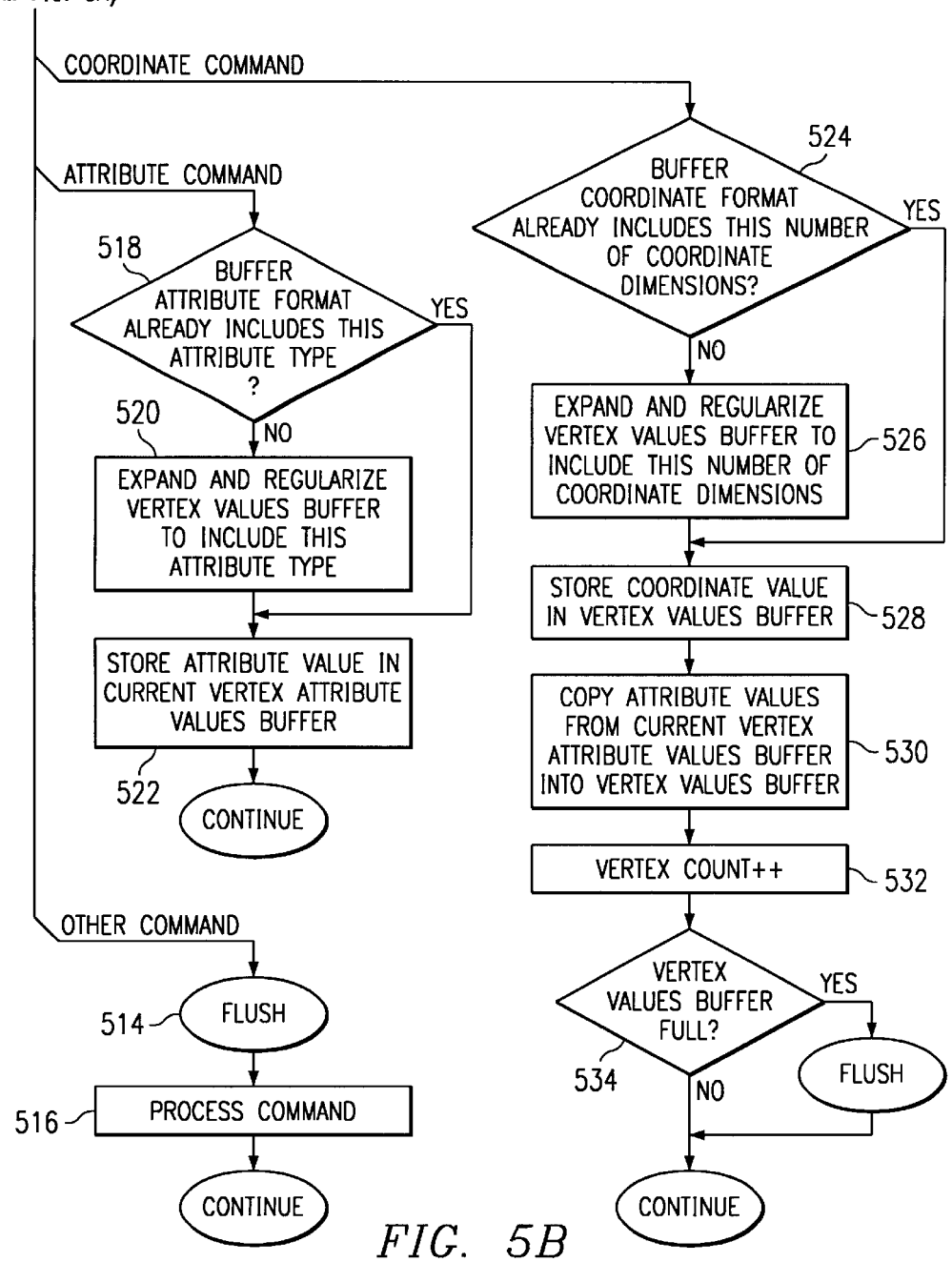
Figure 7:
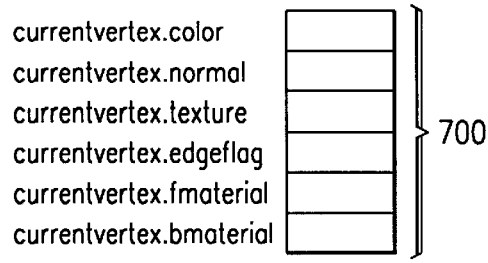
FIG. 7 is a block diagram illustrating the current vertex attribute values buffer of FIG. 5.
Figure 8:
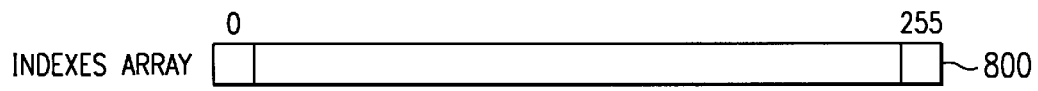
FIG. 8 is a block diagram illustrating the indexes array of FIG. 5.

FIG. 5 illustrates, in broad overview, a method 500 of buffering graphics commands according to a preferred embodiment of the invention. It will be discussed herein with supporting references to FIGS. 6, 7 and 8. At initialization step 502, a large area of memory is allocated for a vertex values buffer 600. The format and types of data stored in vertex values buffer 600 will change from time to time during the normal performance of method 500. At times, vertex values buffer 600 may contain coordinates values only for each vertex; at other times, vertex values buffer 600 will contain not only coordinate values, but also attribute values such as color values and normal values for each vertex. Preferably, this is accomplished by using an interleaved array so that the coordinate values and attribute values for each vertex are associated with one another in a convenient manner. At initialization time, the memory area allocated for vertex values buffer 600 may be large enough to handle a worst-case scenario in which every possible attribute value must be stored in association with the coordinate values for every vertex. The length of vertex values buffer 600 may be arbitrary; for example, it may be sized large enough to handle 256 vertices stored in the worst-case format as floating point numbers.

The contents of vertex values buffer 600 shown in the drawing are for illustrative purposes only. They reflect an example case in which only coordinate values, color values and normal values are stored for each vertex. All values for vertex 0 are stored first, then the values for vertex 1 sequentially after the values for vertex 0, and so on. The length of the total set of values for one vertex sets the stride for the array. Within each record, coordinate and attribute values may be located by their offsets. For the example shown, coordinate values are stored at an offset of zero from the beginning of the record. Color values are stored at an offset of offset.color from the beginning of the record, and normal values are stored at an offset of offset.normal. Because the values for the next vertex begin immediately after the values for the previous vertex, vertex values buffer 600 is known as a "packed" array. The inventors believe enhanced performance is gained by the use of a packed interleaved array to implement vertex values buffer 600, but other types of arrays may be used.

In OpenGL, vertex coordinates may be specified in 2, 3 or 4 dimensions. Thus, the vertex coordinate entries 602 in vertex values buffer 600 may be sized differently depending on the number of coordinate dimensions that are to be stored for each vertex. This sizing according to number of coordinate dimensions stored will be referred to herein as the "buffer coordinate format." Similarly, the number of attributes stored for a given vertex, as well as the number of dimensions used to specify certain attribute values, will vary. These parameters will be referred to herein as the "buffer attribute format."

Also at initialization step 502, a current attribute values buffer 700 is created in memory. This buffer need only be large enough to store a single attribute value (one vertex worth) for each attribute type: color value, normal value, texture coordinate value, edge flag value, front face material values, and back face material values. In a preferred embodiment, separate arrays may be provided to store material values because of their size. An indexes array 800 is also created in memory. Indexes array 800 should contain the same number of entries as the vertex values buffer contains vertices—in the example case shown, 256 entries. Indexes array 800 will store integer index values that will be used by the glDrawArraySetHP function to render the contents of vertex values buffer 600. Finally, a primitive count variable is set to zero, and a vertex count variable is set to zero.

At step 504, a computer graphics function call is received from application software. The function call will correspond to one of many possible graphics commands. Preferably, the code to be executed in response to the command will be determined by a dispatch table entry; thus, decision box 506 shown in the drawing for convenience need not be implemented as an actual decision, but rather as a reference to the dispatch table.

The inventors have observed that one way to conserve processor states when buffering computer graphics commands is to buffer more than one primitive before flushing the buffer. In this manner, the overhead states required to set up and execute an array function call may be amortized over numerous primitives rather than spent on every single primitive. Not only are processor states saved by this technique, but bandwidth savings are achieved as well in implementations that must send graphics data over a network to be rendered on a remote platform. Before multiple primitives can be buffered, however, new buffer flush conditions must be recognized and handled:

For example, if a glBegin command is received at step 504, but its effect will be to alter the primitive type relative to the previously set primitive type (step 510), then operation proceeds directly to the flush routine. On the other hand, if the glBegin command will not change the primitive type, then the value of the vertex count variable is stored in indexes array 800 at primitive count (step 512). If the command received at step 504 is neither a glBegin, glend, a vertex coordinate command nor a vertex attribute command, then it is a good assumption that the command will change the modal state in some way (light sources, clip parameters, etc.). Therefore, in a preferred embodiment, operation proceeds directly to the flush routine (step 514) in such cases. Then, the command is processed (step 516).

Once a glBegin command has been received, generally the next commands will be some combination of vertex attribute commands followed by a vertex coordinate command and a glEnd command. Assume the command received at step 504 is a vertex attribute command (such as glColor, glNormal, etc.). The preferred action in response to the vertex attribute command depends on the buffer attribute format and on the attribute type of the command. Although a decision block is shown at step 518 in the drawing for convenience, an actual decision need not be made at this juncture every time a vertex attribute command is issued by application software. This will be explained in more detail below in the section titled "implementation." For purposes of explaining the basic method, however, assume that a decision is made at step 518.

Figure 6:
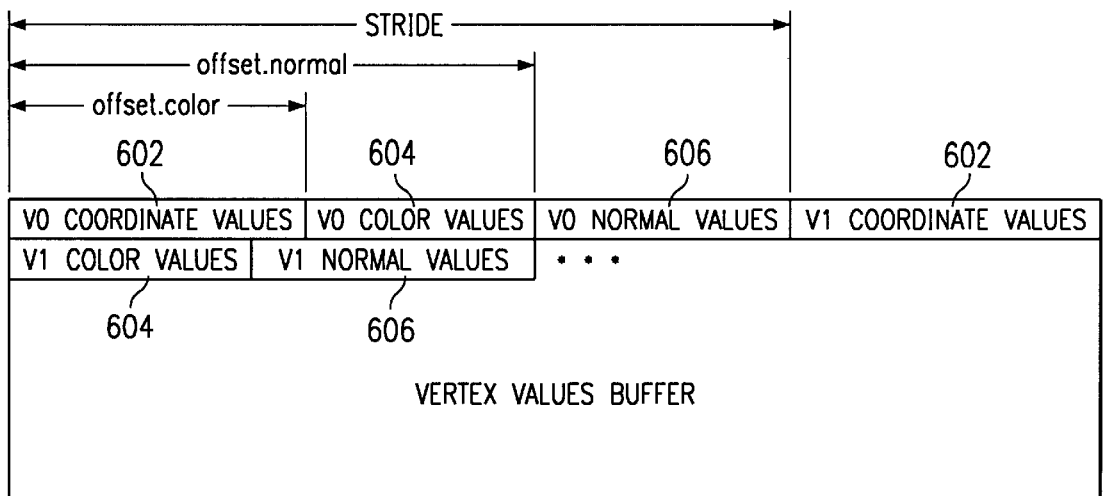
FIG. 6 is a block diagram illustrating the vertex values buffer of FIG. 5.

Suppose the buffer attribute format at this moment is as shown in FIG. 6 (colors and normals currently being buffer, but no other attribute types). If the attribute command issued by the application is glTexCoord, then the buffer attribute format does not include space for the new attribute value. If this is the case, then operation proceeds with step 520, wherein vertex attribute buffer 600 is rearranged so that an array of texture coordinate values is interleaved with the already-existing arrays of coordinate values, color values and normal values. The result of this will be that the stride of the vertex values buffer will change, and a new offset corresponding to the texture values will need to be remembered. Finally, the new texture coordinates array must be "regularized." To accomplish this, the texture coordinate value in OpenGL state is written into the new texture coordinate array up to the location of the current vertex. At the location of the current vertex, nothing is yet written into vertex values buffer 600. Instead, the newly-specified texture coordinate value is written into current vertex attributes buffer 700 in step 522. If a texture coordinate array with the appropriate dimensions already existed in vertex values buffer 600, then step 520 would be skipped. After step 522, operation continues at step 504.

Suppose now that the next command received in step 504 is a vertex coordinate command (such as glVertex2, glVertex3 or glVertex4). A decision block is shown at step 524, again for convenience of illustration. If the buffer coordinate format does not currently support the number of dimensions specified by the newly-received coordinate command, then vertex values buffer 600 is rearranged at step 526 so that the vertex coordinate array contained therein is large enough to support the new number of dimensions at every vertex. For the vertex coordinate values already in the buffer, a default value of 0 is written into the previously-unspecified dimension of the already-buffered vertices. Then the newly-specified vertex coordinate value is written into the vertex values buffer at step 528. If the buffer coordinate format already supported the new vertex coordinate command (for example, if the buffer coordinate format currently stores 4 coordinate dimensions for each vertex, and the new vertex command is glVertex3), then step 526 would be skipped.

If desired, the invention may be implemented in a manner that flushes vertex values buffer 600 before it is expanded in steps 520 or 526, or such a flushing step may be made an option depending on the number of vertices stored in the buffer. If the buffer is flushed before it is expanded, then regularization of the newly-expanded buffer would be unnecessary.

At step 530, attribute values are copied from current vertex attribute values buffer 700 into vertex values buffer 600 at the location of the current vertex. Only those attribute values are copied for which arrays exist in vertex values buffer 600, thus saving processor states. For example, if the buffer attribute format is as shown in FIG. 6, then only color values and normal values will be copied from current vertex attribute values buffer 700 into vertex values buffer 600. The section below titled "implementation" will explain a way in which this may be accomplished without inserting decisions into the processing stream each time a vertex coordinate command is encountered. After step 530, the vertex count variable is incremented in step 532, and a check is made at step 534 to determine whether vertex values buffer 600 is full. (The vertex count is compared with a maximum value—in the example case shown, 255.) If it is determined in step 534 that vertex values buffer 600 is full, then operation proceeds with the flush routine; if not, then operation continues at step 504.

If a glEnd command is received at step 504, the primitive count variable is incremented at step 536 and operation continues at step 504 again.

Whenever the flush routine is invoked, a decision is made at step 538 to determine whether any vertices corresponding to an incomplete primitive are currently stored in vertex values buffer 600. If so, then in step 540 those values may be saved away into a temporary buffer. Then, the complete primitives in vertex values buffer 600 may be passed down the graphics pipeline in step 542 for rendering. To accomplish this, draw arrays state should be modified to enable the use of and provide pointers to the vertex coordinates array and any arrays included in the buffer attribute format. (Preferably, this is done at the time when vertex values buffer 600 is created, and at any time when it is modified, such as at steps 520 or 526.) The value [vertex count+1] should be written into indexes array 800 at primitive count. Then, a call may be made to the glDrawArraySetHP function to render the buffered primitives. After this has been done, the values of the primitive count variable and the vertex count variable should be reset to zero in step 544. If any vertices corresponding to an incomplete primitive were previously saved away (step 546), they may be written into the beginning of vertex values buffer 600 in step 548. If so, then the value of the vertex count variable should be adjusted appropriately, as indicated at step 550. For example, if three vertices were saved away in step 540 and written back in step 548, then the value of vertex count should be adjusted to 3 before proceeding; but primitive count should still be zero.

If desired, the flush routine may be modified so that an incomplete primitive is spanned across buffers. To do so, additional code must be written to ensure continuity in rendering of the spanned primitive. For example, special considerations apply when spanning fans or strips or when using stipple patterns or outline mode. But such considerations will not be discussed in detail herein; spanning primitives across buffers is not a requisite for the successful practice of the invention, and persons having skill in the art and having reference to this specification will appreciate the problems that must be addressed in order to span primitives across buffers.

The just-described buffering method achieves important efficiencies that are not achieved by the buffering methods of the prior art: Multiple primitives are buffered between flushes, thereby conserving processor states by amortizing array function overhead across multiple primitives. In addition, vertex values buffer 600 automatically "adapts" itself to the application software by changing its buffer coordinate format and buffer attribute format as needed. Because this adaptation is done automatically and in a way that is responsive to the types of commands being issued by the application software, processor states may be conserved by initializing with a minimalist vertex values buffer and then expanding it only as necessary. Moreover, the inventive buffering method yields a buffer that is already regularized at flush time.

If desired, the vertex values buffer can be reinitialized to a minimal configuration periodically during operation. For example, reinitialization may be performed after some maximum number of buffer flushes. Or, reinitialization may be performed in response to modal state changes that imply the exclusion of certain attribute types. For example, if a state command turns texturing off, then it is a good assumption that forthcoming vertex attribute commands will not include glTexCoord commands; thus, reinitialization after such a state command may yield performance benefits.

Implementation

Figure 9:
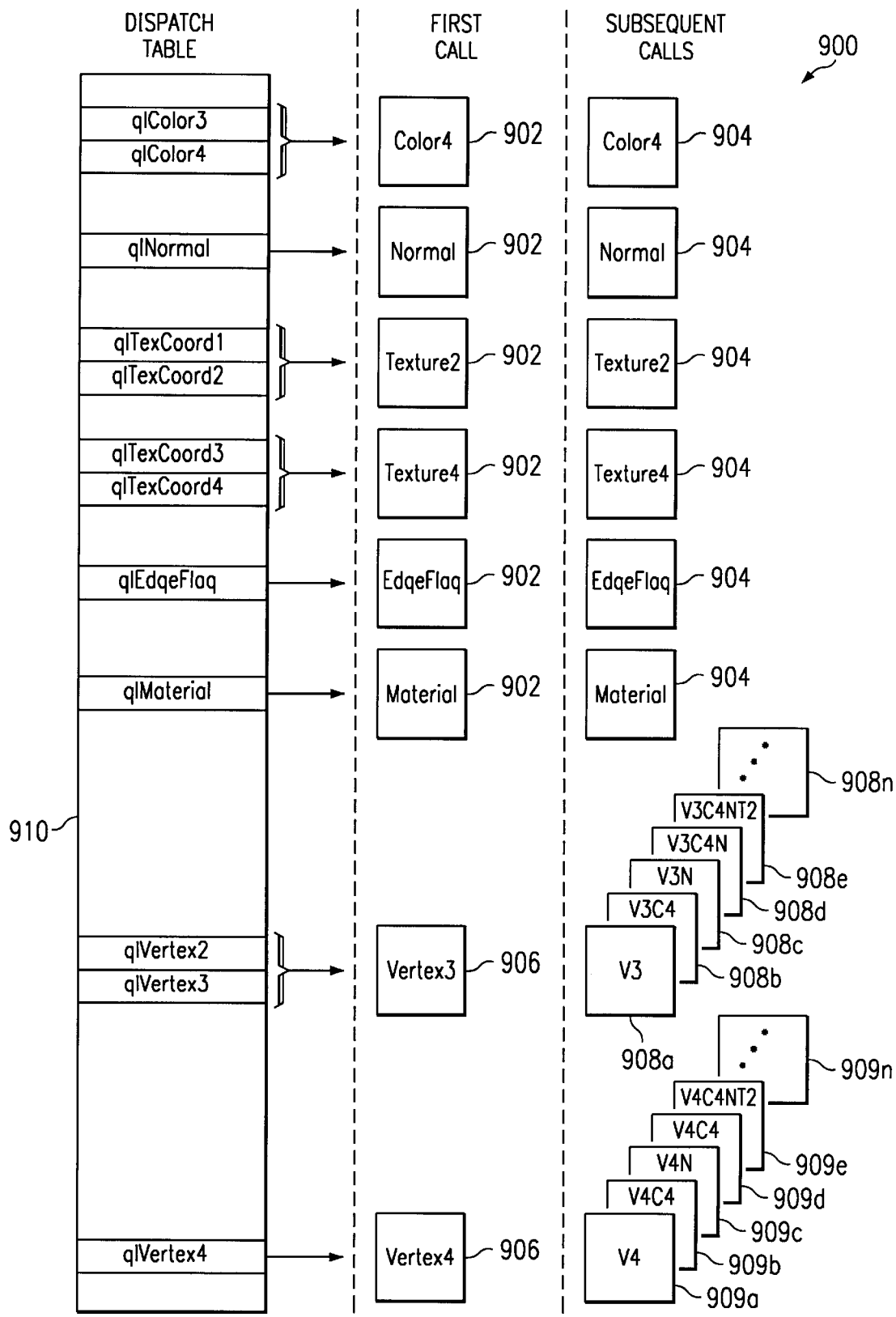
FIG. 9 is a block diagram illustrating a dispatch table and multiple versions of command code segments according to a preferred implementation of the invention.

Further efficiencies may be achieved by implementing the inventive method in a preferred manner that will now be described with reference to FIGS. 9–14. FIG. 9 illustrates a preferred embodiment 900 wherein first-call and subsequent-call versions of code are provided for vertex attribute commands and for vertex coordinate commands. In short, the first-call versions 902 of the vertex attribute commands perform the functions described in steps 518 and 520 of FIG. 5. And the subsequent-call versions 904 simply perform the function described in step 522. Similarly, the first-call versions 906 of the vertex coordinate commands perform the functions described in steps 524 and 526. And the subsequent-call versions 908/909 of the vertex coordinate commands simply perform the functions described in steps 528–534. The first-call code versions perform some other functions as well with regard to manipulation of dispatch table 910; these functions will be described in more detail below.

In addition to providing first-call and subsequent-call versions of code for the vertex coordinate commands, preferred embodiment 900 also provides multiple subsequent-call versions a–n for each of the implemented vertex coordinate commands 908/909, as shown. Each of the multiple subsequent-call coordinate command versions is optimized for a particular buffer attribute format and buffer coordinate format. For example, coordinate command code version 908(*a*) assumes a buffer coordinate format wherein three or fewer dimensions are specified for each vertex (thus the nomenclature V3), and no vertex attributes are specified. Version 908(*b*) assumes a buffer coordinate format of V3, and a buffer attribute format of C4 (meaning four or fewer color values are specified for each vertex, but no other attribute values are specified). By way of further example, coordinate command code version 909(*e*) assumes the following buffer coordinate and attribute format for each vertex: four or fewer coordinate dimensions, four or fewer color values, normal values, and two or fewer texture coordinates. In theory, a different coordinate command version may be provided for every permutation and combination of buffer coordinate formats and buffer attribute formats. In practice it is probably preferable to provide only a subset of all possible versions, provided the subset is sufficient to handle all conditions. Similarly, the set of coordinate command versions provided for handling the V3 combinations can be used to handle V2 combinations. Also, the attribute command versions provided for handling T4 formats can be used to handle T3 formats, and the versions provided for handling T2 formats can be used to handle T1 formats. The same is true for the attribute command versions for handling color formats, as shown.

Figure 10:
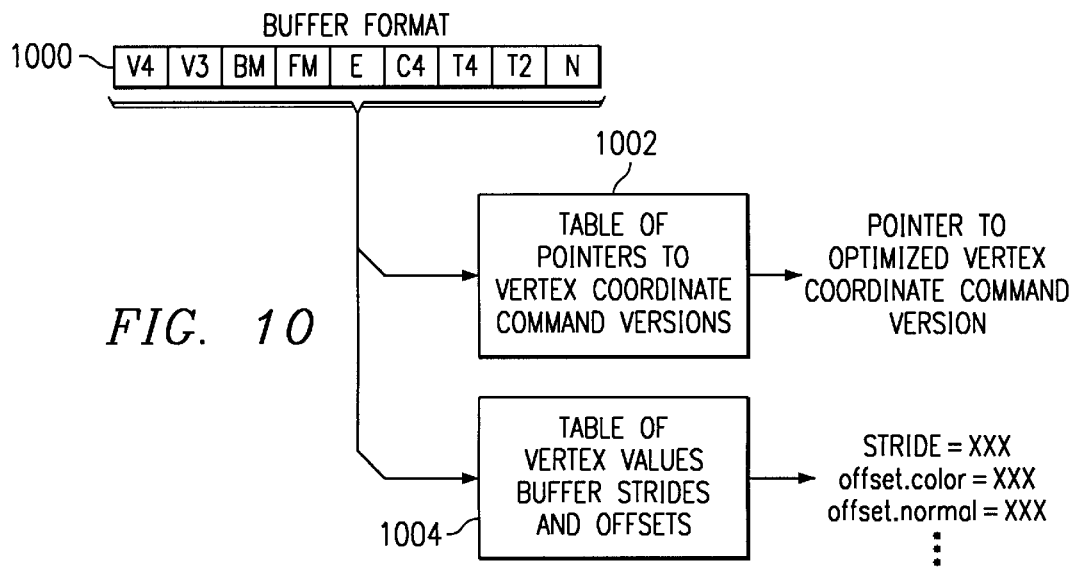
FIG. 10 is a block diagram illustrating a buffer format variable and its use with two lookup tables according to a preferred implementation of the invention.

Referring momentarily now to FIG. 10, a buffer format variable 1000 may be created and initialized at step 502 as a way of keeping track of the vertex coordinate format and vertex attribute format of vertex values buffer 600. If the V4 bit is set in buffer format variable 1000, it means that vertex values buffer 600 is currently set up to handle vertex coordinate values having four or fewer dimensions. If the V3 bit is set, the vertex coordinate format can handle three or fewer dimensions. If the BM or FM bits are set, it means the vertex attribute format includes back face material values or front face material values, respectively. If the E bit is set, the vertex attribute format includes edge flags. If the C4 bit is set, the vertex attribute format includes color values with space for up to four values for each vertex. If the T4 or T2 bits are set, the vertex attribute format includes space for texture coordinates having four or two dimensions, respectively, per vertex. If the N bit is set, the vertex attribute format includes normal values.

Also at initialization time, dispatch table 910 should be populated with pointers to first-call versions for all attribute and coordinate commands. Thereafter, the dispatch table entries will be manipulated by the commands themselves.

Figure 11:
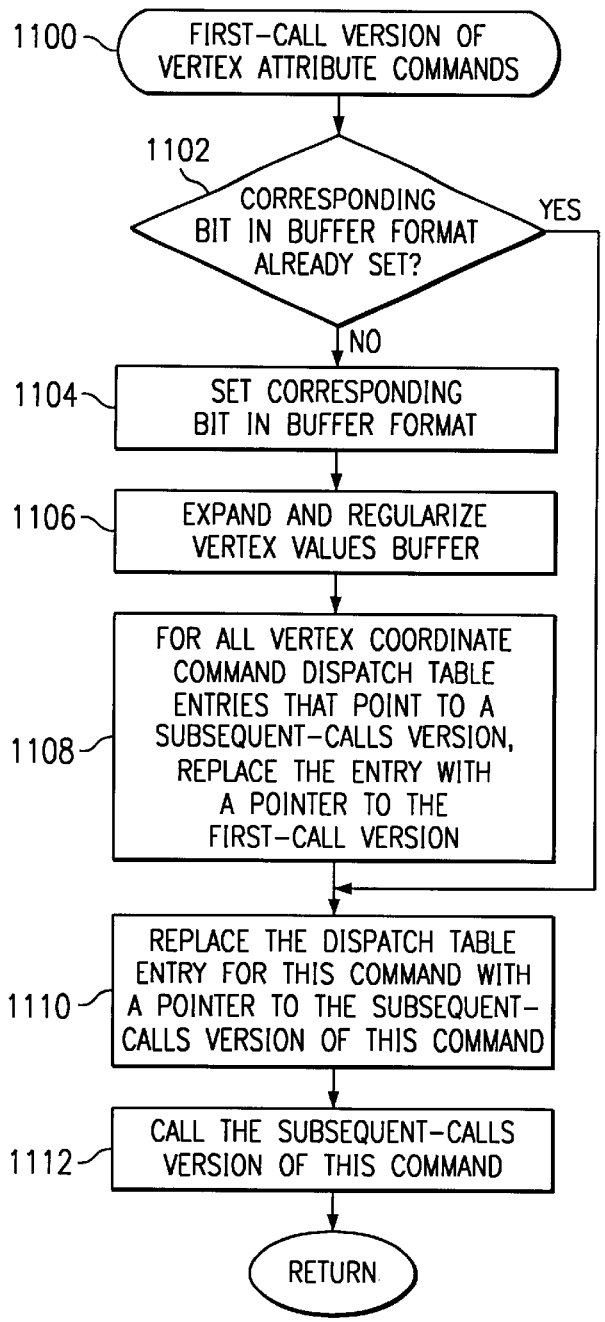
FIG. 11 is a flow diagram generically illustrating a preferred implementation for the first-call versions of the attribute commands of FIG. 9.

FIG. 11 generically illustrates a preferred implementation for the first-call versions of vertex attribute commands. Because of the initialization state of dispatch table 910, code segment 1100 will be executed in response to the first issuance of this attribute command by the application software. In step 1102, the code checks the buffer format variable to determine whether the current buffer attribute format is compatible with the attribute value specified by this attribute command. For example, the first call of glColor4 will check the C4 bit in the buffer format variable. If the bit is already set, operation continues with step 1110. If not, operation continues with step 1104. In step 1104, the code sets the appropriate bit in the buffer format variable for future reference. In step 1106, the code rearranges vertex values buffer 600 to include an array for the new attribute type.

Recall that, in order to achieve enhanced efficiency, the subsequent-calls versions of the vertex coordinate commands assume a certain buffer format without first determining what the buffer format actually is. Therefore, now that the first-call version of an attribute command has changed the buffer format, any dispatch table entries that point to subsequent-calls versions of coordinate commands will have to be reinitialized. This is done in step 1108. After those pointers have been replaced, the coordinate commands can adjust themselves to the new buffer format whenever they are called next by the application software. In step 1110, the code replaces its own dispatch table entry with a pointer to the subsequent-calls version of this command. Then, in step 1112, the subsequent-calls version is called.

Figure 12:
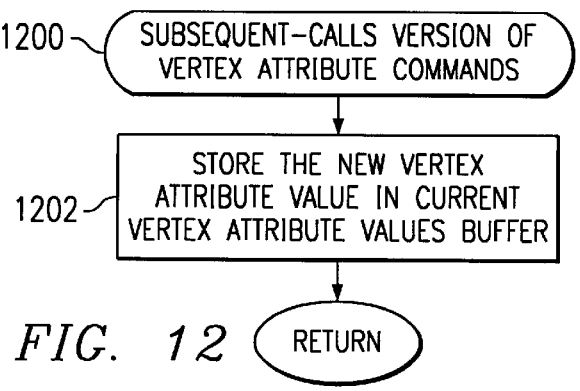
FIG. 12 is a flow diagram generically illustrating a preferred implementation for the subsequent-calls versions of the attribute commands of FIG. 9.

FIG. 12 generically illustrates a preferred implementation for the subsequent-calls versions 1200 of vertex attribute commands. At step 1202, the code simply stores the attribute value specified by the attribute command into current vertex attribute values buffer 700.

Figure 13:
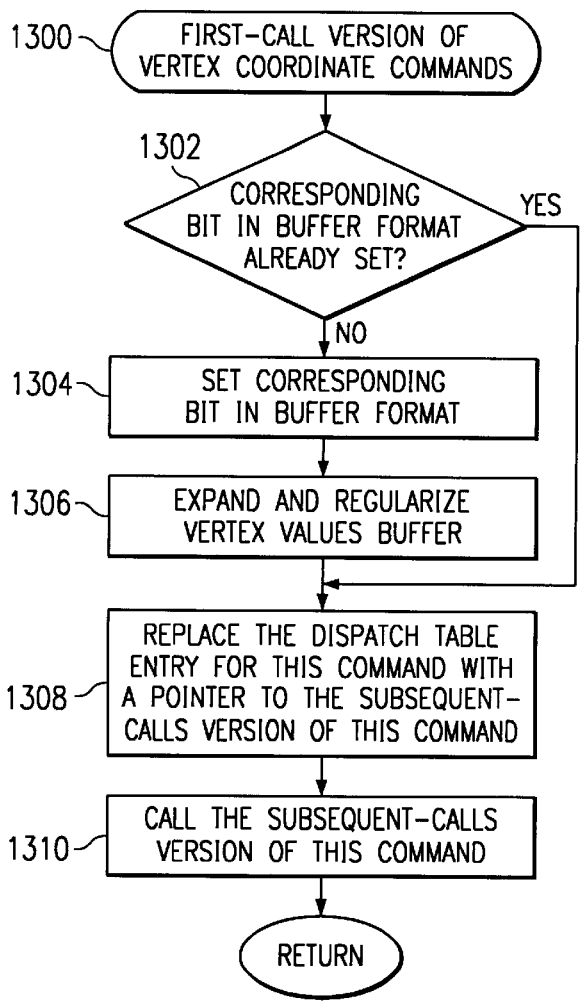
FIG. 13 is a flow diagram generically illustrating a preferred implementation for the first-call versions of the coordinate commands of FIG. 9.

FIG. 13 generically illustrates a preferred implementation for the first-call versions 1300 of vertex coordinate commands. Because of the initialization state of dispatch table 910, code segment 1300 will be executed in response to the first issuance of this coordinate command by the application software. In step 1302, the code checks the buffer format variable to determine whether the current buffer coordinate format is compatible with the number of dimensions specified by this coordinate command. For example, the first call of glVertex4 will check the V4 bit in the buffer format variable. If the bit is already set, operation continues with step 1308. If not, operation continues with step 1304. In step 1304, the code sets the appropriate bit in the buffer format variable for future reference. In step 1306, the code rearranges vertex values buffer 600 to include space for the new vertex coordinate format.

In step 1308, the code replaces its own dispatch table entry with a pointer to the subsequent-calls version of this command that is optimized for the current buffer format. To accomplish this, use may be made of table 1002. Table 1002 maps the various possible buffer formats to the coordinate command functions that are optimized for them. To determine in step 1308 which pointer should be placed in dispatch table 910, the contents of buffer format variable 1000 may be used as an index into table 1002. The output of table 1002 will be a pointer to the vertex coordinate command that is optimized for the current buffer format. In step 1310, the first-call coordinate command code calls the subsequent-calls version that was selected in step 1308.

Incidentally, another useful application of buffer format variable 1000 involves table 1004. Table 1004 provides a list of stride values and offsets corresponding to each of the possible formats of vertex values buffer 600. The contents of buffer format variable 1000 may be used as an index into table 1004 whenever these values must be determined.

Figure 14:
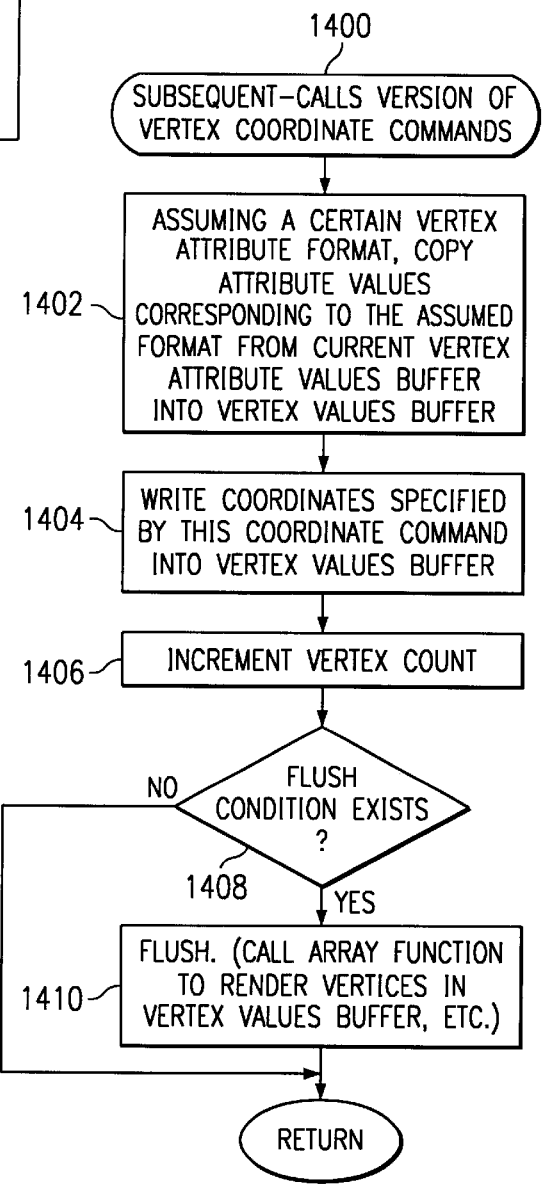
FIG. 14 is a flow diagram generically illustrating a preferred implementation for the subsequent-calls versions of the coordinate commands of FIG. 9.

FIG. 14 generically illustrates a preferred implementation for the subsequent-calls versions 1400 of vertex coordinate commands. In step 1402, the code simply copies certain attribute values from current vertex attribute buffer 700 into vertex values buffer 600. But no decisions are required for determining which values to copy; rather, the code version has been previously selected because it corresponds to the current buffer format. Thus, the code copies only the values required by the current buffer format, and no others. In step 1404, the code writes the coordinates specified by the command into vertex values buffer 600. In step 1406, the vertex count value is incremented. In step 1408, the vertex count variable is compared with a maximum value to determine whether vertex values buffer 600 is full. If it is, then the flush routine is invoked at step 1410. If not, the code returns.

The embodiment described herein with reference to FIGS. 9–14 conserves additional processing states because it reduces the number of decisions made during buffering: Once a selection has been made as to which subsequent-calls code version is optimal for the current buffer format, no further decisions relating to the buffer format need be made until the buffer format changes.

While the invention has been described in detail herein with regard to specific embodiments, these embodiments have been described by way of example and not by way of limitation. Persons having ordinary skill in the art and having reference to this specification will appreciate that various alternative embodiments may be achieved without deviating from the scope of the appended claims and their equivalents. For example, the invention is not limited to OpenGL environments, but may be applied with similar benefits in other API environments.

What is claimed is:

1. A method of buffering computer graphics commands issued by application software, the method comprising the steps of:

creating a vertex values buffer for storing vertex coordinate values in association with vertex attribute values;
creating a current vertex attribute values buffer;
receiving a computer graphics function call issued by the application software; and
if the function call corresponds to a vertex attribute command:
storing the vertex attribute value into the current vertex attribute values buffer; and
resuming operation at the receiving step; but
if the function call corresponds to a vertex coordinate command:
storing the vertex coordinate value into the vertex values buffer;
copying vertex attribute values from the current vertex attribute values buffer into the vertex values buffer;
if the vertex values buffer is full, flushing the vertex values buffer; and resuming operation at the receiving step.

2. The method of claim 1,
wherein each vertex coordinate value stored in the vertex values buffer is associated with a set of vertex attribute values having various types;
wherein the types of vertex attribute values included in the set are the same for every vertex coordinate value stored in the vertex values buffer and thereby define a buffer attribute format; and
wherein the types of vertex attribute values that are copied from the current vertex attribute values buffer into the vertex values buffer during the copying step correspond to the buffer attribute format.

3. The method of claim 2, wherein the copying step comprises the step of:
executing vertex coordinate command code that is optimized for the buffer attribute format in that the vertex coordinate command code assumes the buffer attribute format, copies only the types of vertex attribute values that are required by the buffer attribute format, and does so without first determining the buffer attribute format.

4. The method of claim 3, wherein the step of executing vertex coordinate command code that is optimized for the buffer attribute format comprises the steps of:
accessing a dispatch table entry corresponding to the vertex coordinate command; and
executing the code pointed to by the dispatch table entry.

5. The method of claim 4, further comprising the steps of:
at initialization, storing in the dispatch table entry a pointer to a first-call version of vertex coordinate command code; and
upon execution of the first-call version of vertex coordinate command code:
determining the buffer attribute format; and
replacing the dispatch table entry with a pointer to a subsequent-calls version of vertex coordinate command code that is optimized for the buffer attribute format.

6. The method of claim 5,
wherein each vertex coordinate value stored in the vertex values buffer comprises the same number of dimension values, the number of dimension values thereby defining a buffer coordinate format; and wherein the method further comprises the steps of:
upon execution of the first-call version of vertex coordinate command code:
determining whether the buffer coordinate format is compatible with the number of dimension values specified by the vertex coordinate command; and
if not, altering the vertex values buffer so that it reflects a new buffer coordinate format that is compatible with the number of dimension values specified by the vertex coordinate command.

7. The method of claim 2, wherein the step of storing the vertex attribute value into the current vertex attribute values buffer comprises the steps of:
accessing a dispatch table entry corresponding to the vertex attribute command; and
executing the code pointed to by the dispatch table entry.

8. The method of claim 7, further comprising the steps of:
at initialization, storing in the dispatch table entry a pointer to a first-call version of vertex attribute command code; and
upon execution of the first-call version of vertex attribute command code:
replacing the dispatch table entry with a pointer to a subsequent-calls version of vertex attribute command code; and
determining whether the buffer attribute format is compatible with the type of vertex attribute value specified by the vertex attribute command and, if not, altering the vertex values buffer so that it reflects a new buffer attribute format that is compatible with the vertex attribute value specified by the vertex attribute command.

9. The method of claim 8, further comprising the step of:
upon execution of the first-call version of vertex attribute command code:
for each vertex coordinate command dispatch table entry that points to a subsequent-calls version of vertex coordinate command code, replacing the entry with a pointer to a first-call version of vertex coordinate command code.

10. The method of claim 1, further comprising the steps of:
if the function call corresponds to a vertex coordinate command:
incrementing a vertex count; and
if the function call corresponds to a command that delimits the end of a primitive:
incrementing a primitive count; and
resuming operation at the receiving step.

11. The method of claim 10, further comprising the steps of:
if the function call corresponds to a command that delimits the beginning of a primitive:
storing an index value derived from the vertex count in an indexes array at a location derived from the primitive count; and
resuming operation at the receiving step.

12. The method of claim 10, further comprising the steps of:
if the function call corresponds to a command that changes the primitive type that will be assumed by a computer graphics pipeline while rendering vertices:
flushing the vertex values buffer; and
resuming operation at the receiving step.

13. The method of claim 10, further comprising the steps of:
if the function call corresponds to a state command that does not delimit a primitive:
flushing the vertex values buffer; and
resuming operation at the receiving step.

14. Computer code in a machine-readable storage or transmission medium which, when executed by a computer, causes the computer to perform a method of buffering computer graphics commands issued by application software, the method comprising the steps of:

creating a vertex values buffer for storing vertex coordinate values in association with vertex attribute values;

creating a current vertex attribute values buffer;

receiving a computer graphics function call issued by the application software; and if the function call corresponds to a vertex attribute command:

storing the vertex attribute value into the current vertex attribute values buffer; and resuming operation at the receiving step; but if the function call corresponds to a vertex coordinate command:

storing the vertex coordinate value into the vertex values buffer;

copying vertex attribute values from the current vertex attribute values buffer into the vertex values buffer;

if the vertex values buffer is full, flushing the vertex values buffer; and resuming operation at the receiving step.

15. The computer code of claim 14, wherein each vertex coordinate value stored in the vertex values buffer is associated with a set of vertex attribute values having various types;

wherein the types of vertex attribute values included in the set are the same for every vertex coordinate value stored in the vertex values buffer and thereby define a buffer attribute format; and wherein the types of vertex attribute values that are copied from the current vertex attribute values buffer into the vertex values buffer during the copying step correspond to the buffer attribute format.

16. The computer code of claim 15, wherein the copying step comprises the step of:

executing vertex coordinate command code that is optimized for the buffer attribute format in that the vertex coordinate command code assumes the buffer attribute format, copies only the types of vertex attribute values that are required by the buffer attribute format, and does so without first determining the buffer attribute format.

17. The computer code of claim 16, wherein the step of executing vertex coordinate command code that is optimized for the buffer attribute format comprises the steps of:

accessing a dispatch table entry corresponding to the vertex coordinate command; and executing the code pointed to by the dispatch table entry.

18. The computer code of claim 17, wherein the method further comprises the steps of:

at initialization, storing in the dispatch table entry a pointer to a first-call version of vertex coordinate command code; and upon execution of the first-call version of vertex coordinate command code:

determining the buffer attribute format; and replacing the dispatch table entry with a pointer to a subsequent-calls version of vertex coordinate command code that is optimized for the buffer attribute format.

19. The computer code of claim 18, wherein each vertex coordinate value stored in the vertex values buffer comprises the same number of dimension values, the number of dimension values thereby defining a buffer coordinate format; and wherein the method further comprises the steps of:

upon execution of the first-call version of vertex coordinate command code:

determining whether the buffer coordinate format is compatible with the number of dimension values specified by the vertex coordinate command; and if not, altering the vertex values buffer so that it reflects a new buffer coordinate format that is compatible with the number of dimension values specified by the vertex coordinate command.

20. The computer code of claim 15, wherein the step of storing the vertex attribute value into the current vertex attribute values buffer comprises the steps of:

accessing a dispatch table entry corresponding to the vertex attribute command; and executing the code pointed to by the dispatch table entry.

21. The computer code of claim 20, wherein the method further comprises the steps of:

at initialization, storing in the dispatch table entry a pointer to a first-call version of vertex attribute command code; and upon execution of the first-call version of vertex attribute command code:

replacing the dispatch table entry with a pointer to a subsequent-calls version of vertex attribute command code; and determining whether the buffer attribute format is compatible with the type of vertex attribute value specified by the vertex attribute command and, if not, altering the vertex values buffer so that it reflects a new buffer attribute format that is compatible with the vertex attribute value specified by the vertex attribute command.

22. The computer code of claim 21, wherein the method further comprises the steps of:

upon execution of the first-call version of vertex attribute command code:

for each vertex coordinate command dispatch table entry that points to a subsequent-calls version of vertex coordinate command code, replacing the entry with a pointer to a first-call version of vertex coordinate command code.

23. The computer code of claim 14, wherein the method further comprises the steps of:

if the function call corresponds to a vertex coordinate command:

incrementing a vertex count; and if the function call corresponds to a command that delimits the end of a primitive:

incrementing a primitive count; and resuming operation at the receiving step.

24. The computer code of claim 23, wherein the method further comprises the steps of:

if the function call corresponds to a command that delimits the beginning of a primitive:

storing an index value derived from the vertex count in an indexes array at a location derived from the primitive count; and resuming operation at the receiving step.

25. The computer code of claim 23, wherein the method further comprises the steps of:

if the function call corresponds to a command that changes the primitive type that will be assumed by a computer graphics pipeline while rendering vertices:

flushing the vertex values buffer; and resuming operation at the receiving step.

26. The computer code of claim 23, wherein the method further comprises the steps of:

if the function call corresponds to a state command that does not delimit a primitive:
  flushing the vertex values buffer; and
  resuming operation at the receiving step.

27. A computer system configured to buffer computer graphics commands issued by application software according to a method comprising the steps of:
  creating a vertex values buffer for storing vertex coordinate values in association with vertex attribute values;
  creating a current vertex attribute values buffer;
  receiving a computer graphics function call issued by the application software; and
  if the function call corresponds to a vertex attribute command:
    storing the vertex attribute value into the current vertex attribute values buffer; and
    resuming operation at the receiving step; but
  if the function call corresponds to a vertex coordinate command:
    storing the vertex coordinate value into the vertex values buffer;
    copying vertex attribute values from the current vertex attribute values buffer into the vertex values buffer;
    if the vertex values buffer is full, flushing the vertex values buffer; and
    resuming operation at the receiving step.

28. The computer system of claim 27,
  wherein each vertex coordinate value stored in the vertex values buffer is associated with a set of vertex attribute values having various types;
  wherein the types of vertex attribute values included in the set are the same for every vertex coordinate value stored in the vertex values buffer and thereby define a buffer attribute format; and
  wherein the types of vertex attribute values that are copied from the current vertex attribute values buffer into the vertex values buffer during the copying step correspond to the buffer attribute format.

29. The computer system of claim 28, wherein the copying step comprises the step of:
  executing vertex coordinate command code that is optimized for the buffer attribute format in that the vertex coordinate command code assumes the buffer attribute format, copies only the types of vertex attribute values that are required by the buffer attribute format, and does so without first determining the buffer attribute format.

30. The computer system of claim 29, wherein the step of executing vertex coordinate command code that is optimized for the buffer attribute format comprises the steps of:
  accessing a dispatch table entry corresponding to the vertex coordinate command; and
  executing the code pointed to by the dispatch table entry.

31. The computer system of claim 30, wherein the method further comprises the steps of:
  at initialization, storing in the dispatch table entry a pointer to a first-call version of vertex coordinate command code; and
  upon execution of the first-call version of vertex coordinate command code:
    determining the buffer attribute format; and
    replacing the dispatch table entry with a pointer to a subsequent-calls version of vertex coordinate command code that is optimized for the buffer attribute format.

32. The computer system of claim 31,
  wherein each vertex coordinate value stored in the vertex values buffer comprises the same number of dimension values, the number of dimension values thereby defining a buffer coordinate format; and wherein the method further comprises the steps of:
    upon execution of the first-call version of vertex coordinate command code:
      determining whether the buffer coordinate format is compatible with the number of dimension values specified by the vertex coordinate command; and
      if not, altering the vertex values buffer so that it reflects a new buffer coordinate format that is compatible with the number of dimension values specified by the vertex coordinate command.

33. The computer system of claim 28, wherein the step of storing the vertex attribute value into the current vertex attribute values buffer comprises the steps of:
  accessing a dispatch table entry corresponding to the vertex attribute command; and
  executing the code pointed to by the dispatch table entry.

34. The computer system of claim 33, wherein the method further comprises the steps of:
  at initialization, storing in the dispatch table entry a pointer to a first-call version of vertex attribute command code; and
  upon execution of the first-call version of vertex attribute command code:
    replacing the dispatch table entry with a pointer to a subsequent-calls version of vertex attribute command code; and
    determining whether the buffer attribute format is compatible with the type of vertex attribute value specified by the vertex attribute command and, if not, altering the vertex values buffer so that it reflects a new buffer attribute format that is compatible with the vertex attribute value specified by the vertex attribute command.

35. The computer system of claim 34, wherein the method further comprises the steps of:
  upon execution of the first-call version of vertex attribute command code:
    for each vertex coordinate command dispatch table entry that points to a subsequent-calls version of vertex coordinate command code, replacing the entry with a pointer to a first-call version of vertex coordinate command code.

36. The computer system of claim 27, wherein the method further comprises the steps of:
  if the function call corresponds to a vertex coordinate command:
    incrementing a vertex count; and
  if the function call corresponds to a command that delimits the end of a primitive:
    incrementing a primitive count; and
    resuming operation at the receiving step.

37. The computer system of claim 36, wherein the method further comprises the steps of:
  if the function call corresponds to a command that delimits the beginning of a primitive:
    storing an index value derived from the vertex count in an indexes array at a location derived from the primitive count; and
    resuming operation at the receiving step.

38. The computer system of claim 36, wherein the method further comprises the steps of:

if the function call corresponds to a command that changes the primitive type that will be assumed by a computer graphics pipeline while rendering vertices:

flushing the vertex values buffer; and resuming operation at the receiving step.

39. The computer system of claim 36, wherein the method further comprises the steps of:

if the function call corresponds to a state command that does not delimit a primitive:

flushing the vertex values buffer; and resuming operation at the receiving step.

* * * * *